US006355599B1

(12) United States Patent
Zahora et al.

(10) Patent No.: US 6,355,599 B1
(45) Date of Patent: *Mar. 12, 2002

(54) RADIATION CURABLE COATING COMPOSITION FOR SUPERCONDUCTING WIRE

(75) Inventors: Edward P. Zahora, Naperville; Steven C. Lapin, Hampshire; David M. Szum, Marengo; Steven R. Schmid, Long Grove, all of IL (US)

(73) Assignee: DSM Desotech, Inc., Elgin, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,441

(22) Filed: Nov. 9, 1999

Related U.S. Application Data

(63) Continuation of application No. 08/774,638, filed on Dec. 30, 1996, now Pat. No. 6,021,338, which is a continuation of application No. 08/378,549, filed on Jan. 25, 1995, now abandoned, which is a continuation of application No. 08/216,294, filed on Mar. 23, 1994, now abandoned.

(51) Int. Cl.$^7$ .................. H01B 12/00; H01B 12/02; H01L 39/12; H02K 1/02
(52) U.S. Cl. .................. 505/233; 505/230; 505/236; 505/237; 505/705; 505/879; 505/903; 505/164; 505/166; 174/125.1
(58) Field of Search .................. 174/125.1; 505/230, 505/233, 236, 237, 704, 705, 879, 902, 903, 164, 166

(56) References Cited

U.S. PATENT DOCUMENTS

| | | |
|---|---|---|
| 4,128,536 A | 12/1978 | Brodsky et al. |
| 4,424,252 A | 1/1984 | Nativi |
| 4,514,468 A | 4/1985 | Lucey |
| 4,565,857 A | 1/1986 | Grant |
| 4,608,409 A | 8/1986 | Coady et al. |
| 4,654,233 A | 3/1987 | Grant et al. |
| 4,833,038 A | 5/1989 | Poole et al. |
| 4,855,184 A | 8/1989 | Klun et al. |
| 4,948,703 A | 8/1990 | Falcone et al. |
| 4,970,197 A | 11/1990 | Shiota |
| 4,990,411 A | 2/1991 | Nakayama |
| 4,992,509 A | 2/1991 | Harris |
| 5,004,646 A | 4/1991 | Benham |
| 5,109,097 A | 4/1992 | Klun et al. |
| 5,177,056 A | 1/1993 | Hilti |
| 5,219,896 A | 6/1993 | Coady |
| 5,384,197 A | 1/1995 | Koyama |

FOREIGN PATENT DOCUMENTS

| | | |
|---|---|---|
| JP | 7-211161 | 8/1995 |

OTHER PUBLICATIONS

Abstract—RD309067 (10.01.90) "Post–treatment of polyimide for layer hardening—by crosslinking at 83 deb. C after resist patterning and etching, before heat treating, reactive ion etching, etc." 1990.

Abstract—JP108285 (10.01.92) "Mfg. patterned metal oxide thin film—applying compsn. contg. metal cpd. coated with polymerisable gps, on substrate, irradiation removing unexposed parts then firing" 1991.

Abstract US337223 (05.02.91) "Coplanar integration of semiconductor IC devices =by forming micro–bridges between neighbouring segments by solidifying flotation liquid" 1991.

Abstract US428392 (04.06.91) "Patterned oxide superconducting thin films—used in prepn. of superconducting thin film devices" 1991.

Abstract US465718 (25.07.91) "Prdn. of thin films superconducting circuit elements—by forming patterned aerosol film of nitrate precursor soln. on substrate, drying and heat–treating on oxygen" 1991.

Abstract JP198210 (+JP113904)(11.15.89) "High mol. wt. polyacetylene prodn.—by irradiation polymerisation of mono:mol monomer layer with magnetic field applied before and/or during poylmerisation" 1989.

Abstract—JP285403 (18.05.90)—"Formation method of pattern of superconductive substance—in which resist layer is formed on conductive substrate and calcined superconductor is electrodeposited on substrate" 1990.

Abstract—US308297 (16.08.90) "Flexible electrically conductive and superductive articles—have organic film support together with release layer formed between the cuprate layer and refactory substrate" 1990.

Abstract—JP176180—"Super–long conjugated poly–di-:acetylene polymer prodn.—by spreading organic solvent contg. di:acetylene deriv. on water surface, gathering and photopolymerising" 1990.

Abstract—CH003215 (22.02.89)—"Diamagnetic compsn. thermosetting resin—and superconductor with specified transition temp. useful for screening magnetic field, etc." 1989.

Abstract—US266014 (+US144525) (19.07.89)—"Pattern of metal oxide superconducting pathways—prepd using polymer metal complex precursor comprising resist polymer and metal cpds., used in semiconductor integrated circuits" 1989.

(List continued on next page.)

*Primary Examiner*—Mark Kopec
(74) *Attorney, Agent, or Firm*—Pillsbury Winthrop LLP

(57) ABSTRACT

This invention provides a radiation curable coating composition for superconducting wires. The coating composition comprises at least one (meth)acrylate terminated urethane oligomer, at least one adhesion promoter, at least one (meth)acrylate functionalized diluent and at least one free radical photoinitiator.

20 Claims, No Drawings

OTHER PUBLICATIONS

Abstract—JP033578 (08/09.84) "Dry–type lithographic pattern prodn. —involves forming polymer film on substrate surface, heating and exposing to electron beam before sputtering and heating processes" 1984.

Abstract—JP138228 (12/12/88) "Composite material having superconducting ceramics layer–coated with radiation–curable or –decomposable material, e.g., polymer" 1988.

Abstract—JP159379 (09.01.89) "Superconductive oxide ceramics material—includes radiation cured protective layer" 1989.

Abstract—JP305752 (09.06.89) "Magnetic sensor—comprises oxide superconductive material with high polymer resin thin film" 1989.

Abstract—JP079055 (06.10.89) "Mfg. ceramics superconductive wire with high critical current density—by heating rod contg. copper and calcium to spin it, heating obtd. linear membre in oxidizing atoms and coating with protective film" 1989.

Abstract—DE826219 (07.02.90)—"Superconductive cable with powder–filled conductor—having shealth of heat–shrunk plastics" 1990.

RADIATION CURABLE COATING COMPOSITION FOR SUPERCONDUCTING WIRE

This is a Continuation of National Appln. Ser. No. 08/774,638 filed Dec. 30, 1996 (now U.S. Pat. No. 6,021,338) which is a continuation of Ser. No. 08/378,549 filed Jan. 25, 1995 (abandoned), which is a continuation of Ser. No. 08/216,294 filed Mar. 23, 1994 (abandoned).

TECHNICAL FIELD OF THE INVENTION

This invention relates to radiation curable coating compositions for superconductors. More particularly, this invention relates to radiation curable coating compositions for superconducting wires that comprise a (meth)acrylate terminated urethane oligomer, an adhesion promoter and a (meth)acrylate reactive diluent.

BACKGROUND OF THE INVENTION

Some materials when cooled below a certain critical temperature (Tc) become superconducting. At the particular Tc of the material, the electrons in the material that are responsible for conduction undergo a collective transition to an ordered state having many unique and remarkable properties. These properties include the loss of resistance to the flow of an electrical current, the appearance of unusual magnetic effects such as a large diamagnetism, substantial alteration of thermal properties and the occurrence of quantum effects otherwise observable only at the atomic and subatomic level.

Some twenty six of the metallic elements are know to be superconductors in their normal forms and another ten become superconductive under pressure or when prepared in the form of highly disordered thin films. Typically, such materials become superconductive only at very low temperatures, such as the boiling point of liquid helium, which is 4.2K. These superconductors have been called low temperature superconductors. However, it has recently been discovered that sintered materials comprising oxides of the elements of group IIa or IIIa of the periodic table can act as superconductors at higher temperatures, such as the temperature of boiling liquid nitrogen (77K). Superconductors based on such materials have been called high temperature superconductors.

There are many potential applications for superconductors, including, but not limited to, magnets for high energy physics applications, rotating machinery (i.e., synchronous generators, homopolar d-c machines), fusion magnets, magnetodynamic generators and magnets for nuclear magnetic resonance imaging, which is also called magnetic resonance imaging. Other applications include motors for marine propulsion and levitated trains for high speed transportation.

To effectively use superconductors in certain applications, superconducting wires must be made. Typically, superconducting wires are made with a metal sheath surrounding a superconducting core. Once a superconducting wire has been made, it is desirable to coat the wire with a dielectric composition. The coating, in addition to providing better structural integrity and protection from environmental stress, insulates wires from each other, particularly when wires are used in windings for motors, magnets and the like.

A coating for a superconducting wire must, however, possess certain properties. For example, the coating must be easy to apply and cure. Preferably, the coating and cure are carried out at ambient temperature. The coating composition should produce or contain a minimum amount of volatile organic compounds that may be emitted into the atmosphere, and the coating composition should be amenable to high speed production operations, and thus have high cure speeds. Lastly, the coating must be able to withstand the temperatures to which the superconducting wire will be subjected. Typically, a superconducting wire is cycled from ambient temperature to the Tc of the superconductor by introducing the superconductor into an environment having the temperature of the boiling point of liquid helium if the superconductor is a low temperature superconductor or the temperature of the boiling point of liquid nitrogen if the superconductor is a high temperature superconductor. Because the difference between the ambient temperature and the Tc is generally very large, the coating must be able to withstand such thermal cycling without detaching from the wire, cracking, splitting or failing in any other way that would affect the insulative or protective functions of the coating.

Thermal cycling can generate mechanical stress in coating compositions because of the differences in thermal expansion between the coating and the metal sheath and superconductor, and most organic polymers, the primary components of many coating compositions, are very brittle at the critical temperatures of both high and low temperature superconductors.

The ability of a coating to retain its integrity during such thermal cycling has been a nemesis to researchers attempting to find suitable coating compositions for superconducting wire. Further, thermally cured coating compositions generally are not preferred for high temperature superconductors because the temperatures required to cure the coatings can reduce the amount of current that can be carried in a wire before losing its superconductive properties. Thus, it is preferable to avoid heating superconductors.

The present invention provides an organic coating composition for superconducting wire that can be cured at ambient temperature and which will withstand the thermal cycling process that is necessary to reach the superconductor's critical temperature.

SUMMARY OF THE INVENTION

The present invention provides a free radical ultraviolet light radiation curable coating composition for superconducting wire that comprises at least one (meth)acrylate terminated urethane oligomer; at least one (meth)acrylate functional acidic adhesion promoter; at least one (meth)acrylate functionalized reactive diluent; and at least one free radical photoinitiator. The (meth)acrylate terminated urethane oligomer may be made from a polyol, a polyisocyanate, and a hydroxy functional (meth)acrylate compound.

The present coating compositions are radiation curable, particularly UV curable and are able to withstand repeated thermal cycling from ambient temperature to the critical temperature of the superconducting wire.

DETAILED DESCRIPTION OF THE INVENTION

This invention provides radiation curable coating compositions for superconductors. Preferably, the superconductors are in the shape of a wire. A superconducting wire has two major components: a superconducting core and a metal sheath that surrounds the superconducting core. In the case of low temperature superconducting wires, the superconducting core typically is composed of one of some 26 metallic elements in their normal form or alloys of certain metallic elements, which become superconductive above the boiling temperature of liquid helium. Metal sheaths for superconductors include, but are not limited to, copper, silver, iron, tin, aluminum, nickel, chromium, palladium, platinum, and gold and alloys thereof. The metal sheath of a low temperature superconducting wire is preferably made of copper. In contrast, high temperature superconducting wire is typically composed of a ceramic core of sintered oxides of elements of group IIa or IIIa of the periodic table such as $(La, Ba)_2CuO_4$, $(La, Sr)_2CuO_4$ and Ba—Y—Cu type, and the metal sheath is preferably silver. It is contemplated that the present coating composition would be suitable for application to any type of material that shows superconductive properties and for which the coating has no detrimental effect on the superconductor. Thus, both low and high temperature superconductors of any composition are within the scope of the invention.

A coating for a superconducting wire is applied to the wire, including the core and sheath, and then cured. Ordinarily, a superconducting wire is coated with only one coating. However, it is possible to coat a superconducting wire with more than one coating having the same or different compositions. If the superconducting wire has more than one coating, each coating may be applied and then the coatings cured at once, or each coating or group of coatings can be applied and then cured followed by the application of another coating or group of coatings until the desired number of coatings has been applied. It is also contemplated that a coating composition may be used to bundle a group of superconducting wires. In other words, two or more superconducting wires may be bonded to each other by the application of a coating composition that is cured subsequent to application. The coating compositions of the present invention may also be used to seal a coil or winding of superconductor wire.

The present coating compositions may be radiation cured. Preferably, the curing is carried out by irradiating the coating with ultraviolet light. However, coating compositions can also be cured by irradiating the composition with a electron beam. Generally, any method that will begin a free radical polymerization of the components of the coating may be used to cure the coating. However, thermal curing is not preferred in most cases as the advantageous properties of most high temperature superconductors are adversely affected by heating. Thus, it is preferable to cure coating compositions at ambient temperature or below. As used herein, the term "ambient temperature" shall mean about room temperature.

When a composition is cured using ultraviolet light, it is preferable to include a photoinitiator in the composition. The photoinitiator is generally present in an amount ranging from about 0.1 to about 10 weight % of the composition. Examples of suitable photoinitiators include, but are not limited to vicinal ketaldonyl compounds (i.e., compounds containing a ketone group and an aldehyde group), 2,2-dimethoxy-2-phenyl acetophenone, xanthone, fluorenone, benzophenone, camphorquinone, anthraquinone, bisimidazole, perfluorinated diphenyl titanocene, 3-methyl acetophenone, 4-chloro-benzophenone, 4,4'-dimethoxy benzophenone, 4,4'-diaminobenzophenone, Michler's ketone, benzoin propyl ether, benzoin ethyl ether, benzyldimethylketal, 1-(4-isopropylphenyl)-2-hydroxy-2-methylpropane-1-one, p,p-bis[(triphenylphosphono)methyl] benzophenone salt, thioxanthone, diethylthioxanthone, 2-isopropylthioxanthone, 2-chlorothioxanthone, 2-methyl-1-(4-(methylthio)phenyl)-2-morpholinopropane-1one, 1-hydroxycyclohexylphenyl ketone (IRGACURE 184 manufactured by Ciba Geigy), diphenyl (2,4,6-trimethylbenzoyl)phosphine oxide (Lucirin TPO manufactured by BASF), 2-hydroxy-2-methyl-1-phenyl-1-propanone (Darocur 1173 manufactured by Ciba Geigy) and the like.

It may also be preferable to include in the composition along with the photoinitiator an agent such as triethyl amine, diethyl amine, N-methyldiethanolamine, ethanolamine, 4-dimethylaminobenzoic acid, 4-dimethylamino-isomethylbenzoate, 4-dimethylaminomethylbenzoate, 4-dimethylaminoisoamylbenzoate and the like to enhance the conversion of photoabsorbed energy to polymerization initiating free radicals.

The free radical ultraviolet light curable coatings of the present invention comprise a (meth)acrylate terminated urethane oligomer, a (meth)acrylate functionalized acidic adhesion promoter and a (meth)acrylate reactive diluent. As used herein the term "(meth)acrylate", and the various grammatical forms thereof, shall mean esters that are the reaction product of acrylic or methacrylic acid with a compound that contains a hydroxyl functional group.

The (meth)acrylate terminated urethane oligomer can be made, for example, by first reacting a polyol with a polyisocyanate. As used herein the term "polyol" shall mean a compound having two or more hydroxyl functional groups, including, but not limited to, polyalcohols, polyethers, polyesters, polycarbonates, glycerol, glycols, pentaerythritol, phenols, polyglycols, alkyds and glucosides.

Representative of the polyesters are the reaction products of polycarboxylic acids or their anhydrides and polyols, preferably diols. Suitable polycarboxylic acids and anhydrides include phthalic acid, isophthalic acid, terephthalic acid, trimellitic acid, tetrahydrophthalic acid, hexahydrophthalic acid, sebacic acid, succinic acid, glutaric acid, malonic acid, pimelic acid, suberic acid, 2,2-dimethylsuccinic acid, 3,3-dimethylglutaric acid, 2,2-dimethylglutaric acid and the like, and anhydrides thereof and mixtures thereof. Suitable polyols include 1,4-butanediol, 1,8-octanediol, trimethylol propane, pentaerythritol and the like.

Representative of the polycarbonates are polyhexamethylene carbonate and polycyclohexane dimethylene carbonate.

Representative of the polyethers are polyalkylene oxide, alkyl substituted polyalkylene oxides, alkyl substituted poly (tetrahydrofurans), and copolymers of the alkyl substituted tetrahydrofurans. and a cyclic ether.

Representative of the polyalkylene oxides are poly (propylene oxide), commercially available from Arco Chemical under the trade designation Arcol PPG 1025 and poly(tetramethylene glycol), commercially available from DuPont under the trade designation Terathane 1000.

As used herein the term "polyisocyanate" shall mean a compound having two or more isocyanate functional groups. Diisocyanates are preferred. Examples of diisocyanates include, but are not limited to, toluene diisocyanate, isophorone diisocyanate, trimethylhexane diisocyanate, dicyclohexylmethane diisocyanate, diphenylmethane diisocyanate, phenylene diisocyanate and diphenyl diisocyanate.

Typically, a polyol is reacted with a polyisocyanate to form a urethane oligomer having reactive isocyanate functional groups. The urethane oligomers having reactive isocyanate functional groups may then be reacted with a (meth)acrylate compound having a hydroxyl reactive functional group, to yield a (meth)acrylate terminated urethane oligomer (i.e., end-capped urethane oligomer).

An end-capped urethane oligomer can be made in many ways. For example, an end-capped urethane oligomer may be made by reacting a diisocyanate with a capping agent to form a monoisocyanate, which is then reacted with a polyol to form the end-capped urethane oligomer. Alternatively, a polyol, polyisocyanate and capping agent may be reacted together at once, or a polyol and polyisocyanate may be reacted first and the resulting urethane oligomer end-capped. Preferably, the capping agent is a monohydroxy (meth) acrylate such as hydroxymethyl acrylate, hydroxyethyl acrylate, hydroxypropyl acrylate or hydroxybutyl acrylate and the like. Most preferably, the monohydroxy functional acrylate is 2-hydroxyethyl acrylate. The end-capped urethane oligomers may be found in the composition in an amount in the range of about 10 to about 80% by weight of the total composition.

The composition also contains (meth)acrylate reactive diluents. The reactive diluents can be a monoacrylate, i.e. having only one acrylate group, or the reactive diluents can have more than one acrylate group such as trimethylolpropane triacrylate. Preferred reactive diluents include, but are not limited to, tetrahydrofuryl acrylate, ethoxyethyl acrylate, trimethylpropane ethoxylate triacrylate, methoxyethyl acrylate, hydroxy functional caprolactone acrylate, ethylene dimethacrylate, diethylene glycol dimethacrylate, diethylene glycol diacrylate, triethylene glycol dimethacrylate, triethylene glycol diacrylate, tetraethylene glycol dimethacrylate, tetraethylene glycol diacrylate, polyethylene glycol dimethacrylate, polyethylene glycol diacrylate, diethylaminoethyl methacrylate, glycidyl methacrylate, epoxy acrylate, glycidyl acrylate, 2-hydroxyethyl methacrylate, hydroxyethyl acrylate, hydroxypropyl methacrylate, hydroxypropyl acrylate, hydroxybutyl methacrylate, hydroxybutyl acrylate, hydroxyhexyl methacrylate, hydroxyhexyl acrylate, butanediol dimethyacrylate, butanediol diacrylate, propanediol dimethacrylate, propanediol diacrylate, pentanediol dimethacrylate, pentanediol diacrylate, hexanediol dimethacrylate, hexanediol diacrylate, neopentylglycol dimethacrylate, neopentylglycol diacrylate, trimethylolpropane triacrylate, trimethylolpropane trimethacrylate, trimethylolethane triacrylate, trimethylolethane trimethacrylate, polypropylene glycol diacrylate, polypropylene glycol dimethacrylate, glyceral monomethacrylate, acrylic acid, methacrylic acid, methyl methacrylate, ethyl methacrylate, propyl methacrylate, butyl methacrylate, pentyl methacrylate, hexyl methacrylate, octyl methacrylate, lauryl methacrylate, benzyl methacrylate, cyclohexyl methacrylate, stearyl methacrylate, methyl acrylate, butyl acrylate, ethyl acrylate, and the like. The (meth)acrylates are generally present in an amount from about 10 to about 75 weight % of the entire composition. The monoacrylates can be found in the composition in an amount in the range of about 10 to about 60% by weight of the entire composition. Compounds having more than one acrylate group may be found in the composition in an amount in the range of about 0 to about 75% by weight of the entire composition, and the composition may contain both monoacrylates and acrylates having more than one acrylate group.

The composition also contains an adhesion promoter. The adhesion promoter is preferably a (meth)acrylate functionalized carboxylic acid or phosphoric acid. Some examples of suitable adhesion promoters include, but are not limited to, acrylic acid, methacrylic acid, β-carboxyethyl acrylate, Ebecryl 170 and Ebercyl 169. The Ebercyl products are acrylate ester derivatives, available from Radcure Specialties in Atlanta, Ga., and are phosphoric acid based adhesion promoters.

Mono or diesters of phosphoric acid having the following formula are also suitable adhesion promoters:

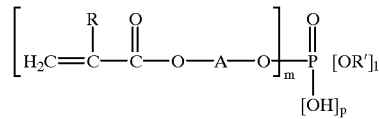

where
  $m+1+p=3$
  $R=H$ or $CH_3$
  $A=C_nH_{2n}$, and $2 \leq n \leq 6$
  $R'=C_1$ to $C_{14}$ alkyl, aryl, alkaryl, or alkyleneoxy Representaive of the various species of organo-phosphate esters having the above formula include, but are not limited to, (1) methylmethacryloyloxyethyl phosphate ($R=CH_3$; $A=$—$C_2H_4$—; $R'=CH_3$, m, 1 and p=1); (2) ethyl methacryloyloxyethyl phosphate ($R=CH_3$; $A=$—$C_2H_4$—; $R'=C_2H_5$); m, 1 and p=1); (3) propylacryloyloxyethyl phosphate ($R=H$; $A=$—$C_2H_4$—; $R'=C_3H_7$; m, 1 and p=1); (4) methyl acryloyloxyethylphosphate ($R=H$, $A=$—$C_2H_4$—; $R'=CH_3$, m, 1 and p=1); (5) ethylacrlyoyloxyethylphosphate ($R=H$; $A=$—$C_2H_4$—; m, 1 and p=1; $R'=C_2H_5$); (6) propyl methacryloyloxyethylphosphate ($R=CH_3$; $A=$—$C_2H_4$—; $R'=C_3H_7$; m, 1 and p=1); (7) bis(methacryloxyethyl) phosphate ($R=CH_3$; $A=$—$C_2H_4$—; m=2; 1=0; p=1); and (8) bis(acryloxyethyl)phosphate ($R=H$; $A=$—$C_2H_4$—; m=2; 1=0; p=1).

The adhesion promoter helps the coating composition adhere to the superconducting wire, and, in particular, to the metal sheath. The adhesion promoter may be used in an amount in the range of about 1 to about 30% of the composition.

In addition to the above components, the composition may also contain other components that are known to those skilled in the art including stabilizers, pigments, surfactants, plasticizers, chain transfer agents and the like.

It was surprising and unexpected to find that the combination of the (meth)acrylate urethane oligomer, (meth) acrylate monomer, and adhesion promotor gave coatings that survived thermal cycling to 77K on superconducting wire.

The following examples are presented to show specific embodiments of the invention. These examples are intended to be illustrative of the invention and not limiting of the specification, including the claims, in any manner.

EXAMPLES

Example 1 shows representative compositions that may be used to coat high temperature superconducting wire.

Example 1

| | COMPONENT | | | |
|---|---|---|---|---|
| | A | B | C | D |
| Acrylate terminated urethane oligomer[1] | 75.89 | 75.89 | 73.90 | 73.90 |
| Trimethylopropane triacrylate | 9.06 | 9.06 | 8.83 | 8.83 |

-continued

|  | COMPONENT | | | |
|---|---|---|---|---|
|  | A | B | C | D |
| Ethoxyethoxy ethyl acrylate | 12.45 | 12.45 | 12.13 | 12.13 |
| Lucirin TPO[2] | 2.00 | 2.00 | 1.94 | 1.94 |
| Phenothiazine | 0.01 | 0.01 | 0.01 | 0.01 |
| DC-57[3] | 0.09 | 0.09 | 0.09 | 0.09 |
| DC-190[4] | 0.20 | 0.20 | 0.19 | 0.19 |
| Diethylamine | 0.30 | 0.30 | — | — |
| Ebecryl 170[5] | — | 5.00 | 2.91 | 4.85 |
| PROPERTIES | | | | |
| Film Thickness, microns | 65 | 73 | 40 | 25 |
| Initial adhesion on silver superconducting wire | 0% | 100% | 100% | 100% |
| Adhesion after ten thermal cycles in liquid $N_2$ | — | 100% | 100% | 100% |

[1]The acrylate terminated urethane oligomer is prepared from a mixture of Adiprene L-200B (80.72%) which may be obtained from Uniroyal of Middlebury CT (Adiprene L-200B is a polyol that is the reaction product of a polytetramethylene ether glycol with 1,3-butanediol and 2,4-toluene diisocyanate), diazabicyclooctane (0.05%), butylated hydroxy toluene (0.10%) and 2-hydroxyethyl acrylate (19.13%).
[2]Lucrin TPO is a product of BASF. It is diphenyl 2,4,6-trimethylbenzoylphosphine oxide.
[3]DC-57 is a product of Dow Corning Corporation and is a silicone additive.
[4]DC-190 is a product of Dow Corning Corporation and is a silicone additive.
[5]Ebecryl 170 is a product of Radcure Specialties and is an acrylate ester derivative of a phosphoric acid.

The physical properties of coating C in Example 1 are density, 1.1 gm/cm³, viscosity, 8630 cps,; and Gardner color, 2.

The coating compositions in Example 1 were brushed on to silver superconducting wire and cured with ultraviolet light (1.0 Joule per square centimeter) using a Fusion D lamp, in nitrogen. The ultraviolet-cured coating in run A without the Ebecryl 170 cures to a flexible coating but has no adhesion to the silver superconducting wire. The coatings containing Ebecryl 170 in runs B, C and D, cure to a tack free flexible coating with strong adhesion to the silver superconducting wire.

It was surprising and unexpected that coatings in runs B, C and D survived thermal cycling and maintained strong adhesion to the silver superconducting wire. This illustrates the importance of the adhesion promoter (Ebecryl 170) in this invention.

Dynamic mechanical testing of coating C in Example 1 showed evidence of a secondary transition at very low temperatures (i.e., below −140° C.). The main evidence is a negative slope for both the E" and tan delta curves at very low temperatures, instead of normal glassy behavior. Additional evidence is the concave upwards portion of the E' curve for a thinner sample from −130° C. to −110° C. Usually, low temperature secondary transitions in polymers are associated with toughness in the temperature range between the secondary and primary transition. This demonstrates the unexpected low temperature mechanical properties of these compositions.

The following are the tensile properties of coating C in Example 1.

| Sample | Thickness | Tensile (MPa) | Elongation (%) | Modulus (MPa) |
|---|---|---|---|---|
| Example 1 Coating C | 75 microns | 13 | 49 | 61 |
| Example 1 Coating C | 25 microns | 11 | 45 | 45 |

The Table has mean values for replicate measurements. The coefficient of expansion (COE) for coating C in Example 1 is cm/cm ° C. below Tg, $14 \times 10^{-5}$ and $25 \times 10^{-5}$ above Tg. This small difference in COE above and below the Tg is important for good low temperature mechanical properties.

Example 2

Low temperature superconducting wire may be coated with the formulations shown in Example 2.

|  | Component | | | | |
|---|---|---|---|---|---|
|  | A | B | C | D | E |
| Acrylate terminated urethane oligomer[1] | 89.70 | — | 72.70 | — | — |
| CN980, aliphatic urethane acrylate[2] | — | 44.85 | — | 36.35 | 52.70 |
| Isobornyl acrylate | — | 44.85 | — | 36.35 | 20.00 |
| Acrylic acid | — | — | 17.00 | 17.00 | 17.00 |
| Butylated hydroxy toluene | 0.03 | 0.03 | 0.03 | 0.03 | 0.03 |
| Darocure 1173[3] | 7.00 | 7.00 | 7.00 | 7.00 | 7.00 |
| MEMO[4] | 2.00 | 2.00 | 2.00 | 2.00 | 2.00 |
| Flow control agent[5] | 0.27 | 0.27 | 0.27 | 0.27 | 0.27 |
| Lucirin TPO[6] | 1.00 | 1.00 | 1.00 | 1.00 | 1.00 |
| PROPERTIES | | | | | |
| Copper wire adhesion, after pull to break | 0% | 0% | 100% | 100% | 100% |
| Copper wire adhesion, after ten cycles in liquid nitrogen | — | — | 100% | — | 100% |
| Viscosity, cps | — | — | 1050 | — | 1740 |
| Density, gm/cm³ | — | — | 1.07 | — | 1.07 |
| Gardner color | — | — | 1 | — | 1 |

[1]The acrylate terminated urethane oligomer in Example 2 is prepared from a mixture of Placcel CD 210 (34.85%) which may be obtained from Daicel Chemical Industries, LTD., Tokyo, Japan (Placcel CD 210 is a polycarbonate polyol), dibutyltin dilaurate (0.04%), phenothiazine (0.04%) 2-hydroxyethyl acrylate (4.37%), isophorone diisocyanate (12.08%) and isobornyl acrylate (48.62%).
[2]CN-980 is a urethane acrylate oligomer from the Sartomer Company, Exton, PA.
[3]Darocure 1173 is a product of Ciba-Geigy, Ardsley, NY. It is 2-hydroxy-2-methyl-1-phenyl-propan-1-one.
[4]MEMO is a product of Huls America, Inc. Piscataway, NJ. It is a 3-methylacryloxypropyltrimethoxysilane.
[5]Dihydroxy-functional polymethyl polysiloxane polyethoxylated to 50% with ethylene oxide to have a molecular weight of 6000 (Dow Corning product Q4-3667 may be used) reacted with one molar proportion of isophorone diisocyanate and one molar proportion of 2-hydroxyethyl acrylate per hydroxy group to give a silicone diurethane diacrylate.
[6]Diphenyl 2,4,6-trimethylbenzoylphosphine oxide.

The coating compositions in Example 2, were applied to copper wire with a die and cured with ultraviolet light in air at 2.0 Joules/cm². The coated wire is stretched to the breakpoint and then wrapped around itself. The coated copper wires from runs C, D and E with acrylic acid as the adhesion promoter have strong adhesion and excellent film appearance after the test. This shows the importance of the acrylic acid adhesion promoter in these compositions. The coated copper wires from runs C and E were cycled ten times between ambient and liquid nitrogen temperatures. It was surprising that the coatings in runs C and E survived this thermal cycling and maintained strong adhesion to the copper wire.

Dynamic mechanical testing of coatings C and E in Example 2 showed evidence of a secondary transition at very low temperatures (i.e., below −140° C.). The main evidence is a negative slope for both the E' and tan delta curves at very low temperatures, instead of the normal glassy behavior. Additional evidence is the concave upwards portion of the E' curve for the samples from −130° C. to −110° C. Usually, low temperature secondary transitions in polymers are associated with toughness in the temperature range between the secondary and primary transition. This demonstrates the unexpected low temperature mechanical properties of these compositions.

We claim:

1. An article comprising:
   (i) a superconducting member; and
   (ii) a coating;
   wherein said coating is formed by curing a composition comprising
      (a) at least one (meth)acrylate terminated urethane oligomer;
      (b) at least one (meth)acrylate functionalized acid adhesion promoter; and
      (c) at least one (meth)acrylate diluent.

2. The article of claim 1, further comprising a metal sheath in contact with said coating.

3. The article of claim 1, further comprising a metal sheath in contact with said member.

4. An article comprising:
   (i) a superconducting core;
   (ii) a metal sheath surrounding said core; and
   (iii) a coating on said sheath;
   wherein said coating is formed by curing a composition comprising
      (a) at least one (meth)acrylate terminated urethane oligomer;
      (b) at least one (meth)acrylate functionalized acid adhesion promoter; and
      (c) at least one (meth)acrylate diluent.

5. The article of claim 4, wherein said sheath comprises copper and/or silver.

6. The article of claim 4, wherein the at least one (meth)acrylate functionalized acid adhesion promoter is selected from the group consisting of (meth)acrylate functionalized carboxylic acids and (meth)acrylate functionalized phosphoric acids.

7. The article of claim 4, wherein said core comprises a metal alloy.

8. The article of claim 4, herein said core is superconductive at 4.2K.

9. The article of claim 4, wherein said core is superconductive at 77K.

10. A magnet comprising the article of claim 4.

11. A fusion magnet comprising the article of claim 4.

12. A magnetic resonance imaging apparatus comprising the article of claim 4.

13. A magnetodynamic generator comprising the article of claim 4.

14. Rotating machinery comprising the article of claim 4.

15. A marine propulsion motor comprising the article of claim 4.

16. A levitated train comprising the article of claim 4.

17. The article of claim 4, wherein said composition further comprises a free radical photoinitiator.

18. A magnetic resonance imaging apparatus comprising a magnet, said magnet comprising a winding, said winding comprising a wire, said wire comprising:
   (i) a superconducting core;
   (ii) a metal sheath surrounding said core; and
   (iii) a coating on said sheath;
   wherein said coating is formed by curing a composition comprising
      (a) at least one (meth)acrylate terminated urethane oligomer;
      (b) at least one (meth)acrylate functionalized acid adhesion promoter;
      (c) at least one (meth)acrylate diluent; and
      (d) at least one free radical photoinitiator.

19. The apparatus of claim 18, wherein said metal sheath is a copper sheath.

20. The apparatus of claim 18, wherein the at least one (meth)acrylate functionalized acid adhesion promoter is selected from the group consisting of (meth)acrylate functionalized carboxylic acids and (meth)acrylate functionalized phosphoric acids.

* * * * *